Sept. 19, 1933. E. WEISKER 1,927,693
PHOTOGRAPHIC APPARATUS
Filed March 23, 1931 2 Sheets-Sheet 1

INVENTOR
Elles Weisker
BY
Joseph F. O'Brien
His ATTORNEY

Sept. 19, 1933.  E. WEISKER  1,927,693
PHOTOGRAPHIC APPARATUS
Filed March 23, 1931  2 Sheets-Sheet 2
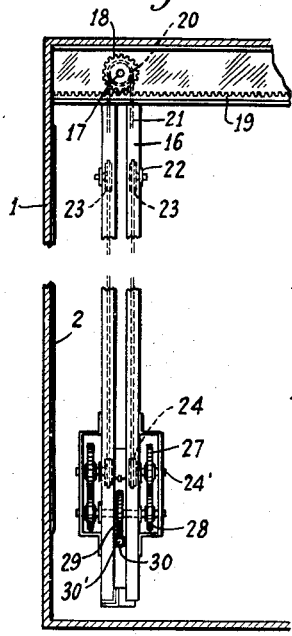
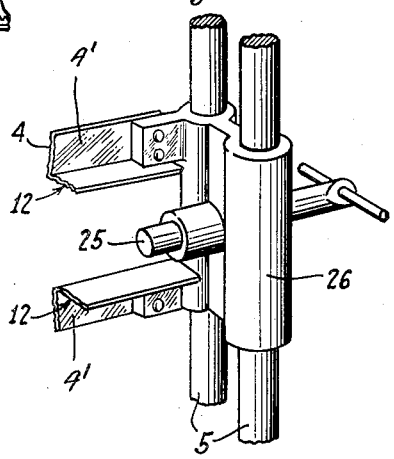
Fig. 7
Fig. 8
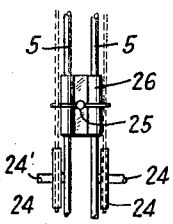
Fig. 9
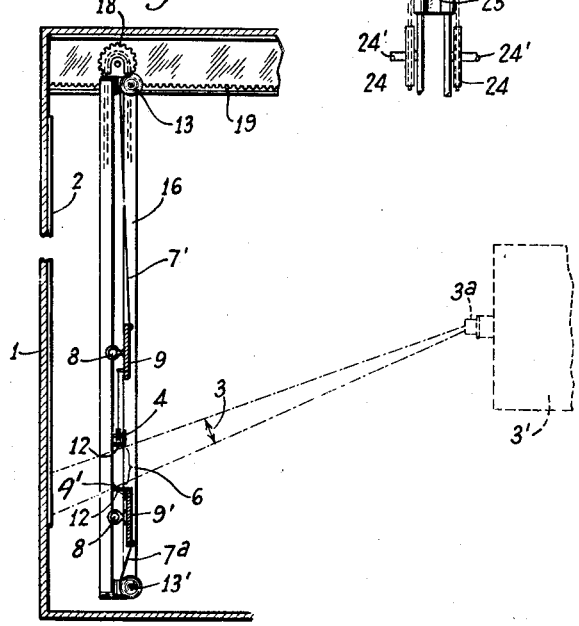
Fig. 10
INVENTOR
Ellis Weisker
BY
Joseph F. O'Brien
ATTORNEY Patented Sept. 19, 1933

1,927,693

UNITED STATES PATENT OFFICE 1,927,693

PHOTOGRAPHIC APPARATUS

Ellis Weisker, New York, N. Y.

Application March 23, 1931. Serial No. 524,609

7 Claims. (Cl. 88—24)

This invention relates to improvements in photographic apparatus.

One of the objects of this invention is to enable, in a space limited substantially to the size of the copy-board or field of view of the camera, the illumination with uniformity of large flat objects such as drawings, maps and the like by an apparatus of the type in which only a slot or ribbon of intense light is exposed to the lens and traversed over the drawing or other object to be reproduced, while all the rest or balance of the field of view of the objective is darkened by a blocking off of all light except such slot or ribbon of light. To this end I provide, in combination, a flexible light-blocking element which is movable across the field of view of the lens and is capable of being folded or rolled at opposite ends during movement of said element in opposite directions and is provided intermediate its ends with an opening in which is positioned an illuminating element or elements.

Another object of my invention is to produce an apparatus of the type hereinabove specified in which the flexible light-blocking element is divided into two separable sections or parts capable of being separated and preferably independently rolled so as to permit focusing of the camera lens on the object and also having the illuminating element mounted between or adjacent to the dividing line between such sections.

Another object of my invention is to provide along the edge of the light-exposing opening or slot, light-shading flanges arranged to block direct light from the illuminating element to the lens and to permit the illuminating element or elements to be positioned closely adjacent to the edge of said opening or slot.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 3 is a section on the line 3—3, of Fig. 2;

Fig. 4 is a section on the line 4—4 of Fig. 2;

Fig. 5 is a view, in perspective, of a slide element in which the slot frames are mounted;

Fig. 6 is an end view of the elements shown in in Fig. 1;

Figs. 7, 8, 9 and 10 are cross-sections showing several modifications of lamp holders.

Figures 1, 2:
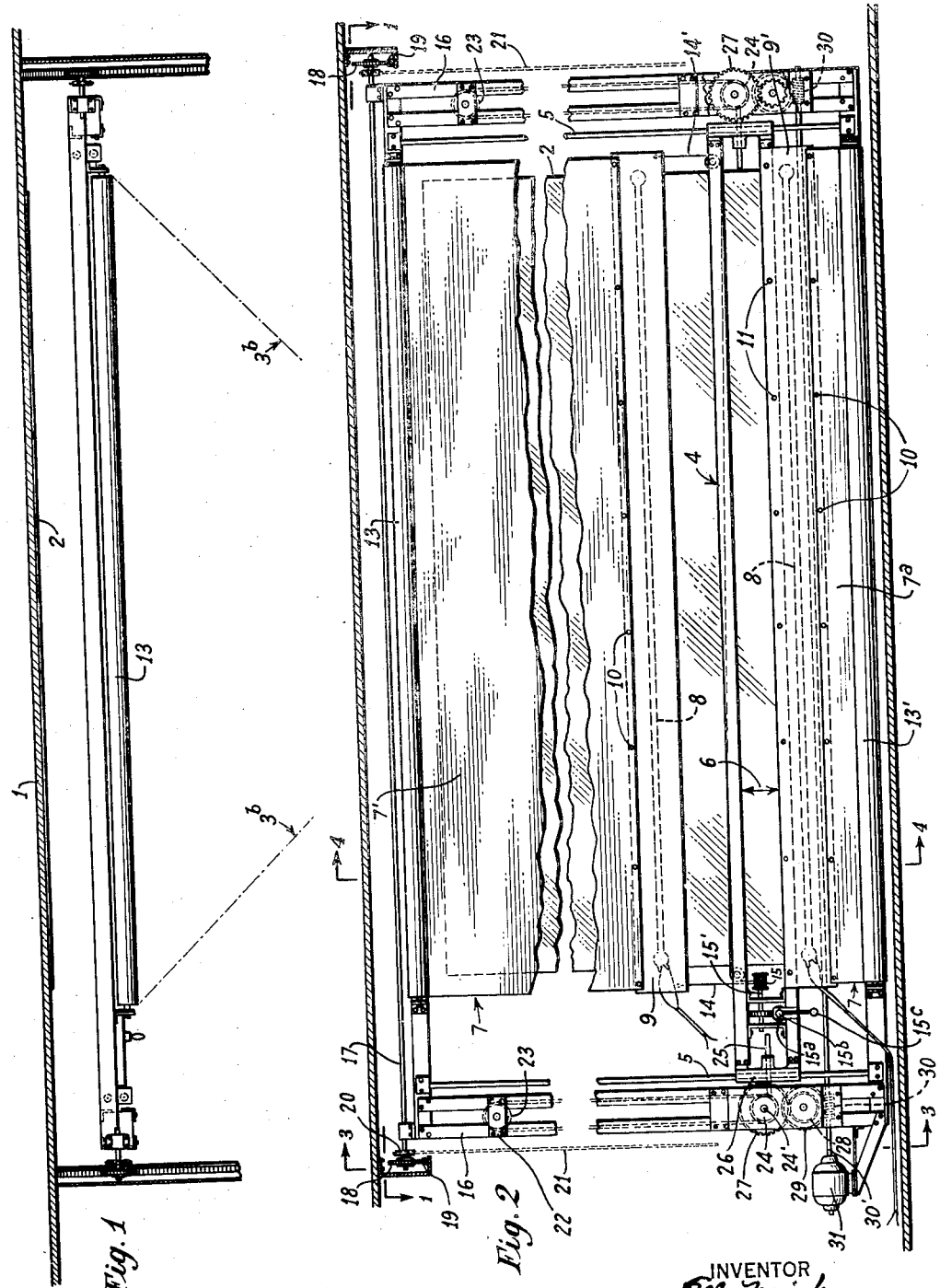
Fig. 1 is a view, in plan, of an apparatus embodying my invention, the same being shown on the line 1—1 of Fig. 2.
Fig. 2 is a front elevation of the apparatus shown in Fig. 1.

Referring now to Figs. 1 to 4 of these drawings, 1 indicates the wall of a building or plant in which my improved apparatus is mounted, 2 indicates a copy-bed or copy-board mounted in vertical position on said wall and 3 indicates in dotted lines the field of view of a conventional camera 3' having a lens-mounting carrier 3ª provided with an objective lens not shown, the said camera being suitably arranged in reference to the copy-board to permit the field of view 3ᵇ of the objective lens to embrace the entire copy-board so that a ribbon, panel or slot of light traversed over said copy-board will be in said field of view and exposed to the objective for the purpose of photographing the object or drawing on the copy-board to be reproduced.

Apparatus of the type in which only a single slot or ribbon of intense light is exposed to the objective lens and is traversed across the field of view thereof, while all the light of the illuminating element within the field of view of the objective lens, except the said slot or ribbon of light is blocked out has been heretofore proposed, but such apparatus has been too large and cumbersome to be employed where space is limited because the light-blocking element has been three times the size of the copy-board and a large amount of space has consequently been required in which to operate such apparatus.

In accordance with my present invention, I am enabled to produce an apparatus of this general type in which the space required for the mounting and operation of the apparatus may be greatly economized.

Also in accordance with my invention, I have provided means whereby the slot of light may be traversed vertically and greater efficiency of operation may be obtained.

Also in accordance with my invention, the light-blocking means may be readily and quickly removed to permit focusing and the illuminating element or lamp serves a double purpose of providing a traversible element for photographing and an adjustable illuminating element for focusing.

As illustrated, I provide a light-exposure frame 4 traversible vertically on guide rods 5 and having therein an exposure-opening or slot 6 of relatively narrow width but of greater length than the copy-board 2 and the balance of the copy-board is covered by a light-blocking element 7 adapted to cover the entire copy-board with the exception only of the opening or slot 6 in the frame 4, thus exposing to the objective lens of the camera only that part of the copy-board which is at any time between the lines of vision from the objective through said opening or slot 6. Illuminating elements or lamps 8, 8 are mounted adjacent to the opposite longitudinal edges of the slot or opening 6 on the side 4' of the frame 4 facing the copy-board. The frame 4 having the illuminating elements 8 so mounted thereon and with the light-blocking element 7 connected to the opposite longitudinal edges of said frame, is traversed over the copy-board and, as shown, in a vertical direction and this traversing movement is continuous from the lower to the upper edge of the copy-board or vice-versa so that in one movement the whole or that part of the copy-board on which is mounted the drawing or other object which it is desired to photograph may be exposed to the objective lens through the slot or opening 6 and photographed, it being understood that the lines of vision from the objective to the copy-board through said slot or opening will, in a complete traversing movement, sweep over the whole copy-board. In accordance with my invention, the light-blocking element 7 is flexible and capable of effectively performing its light-blocking function while at the same time enabling the mounting of the apparatus in a space not substantially greater in area than the size or area of the copy-board which, of course, usually is substantially co-extensive with the field of view of the camera lens and represents the minimum of space necessary for the making of photographic representations of maximum size by a given camera lens.

In the preferred embodiment of my invention illustrated, the light-blocking element is formed in two separable sections 7', 7ª preferably divisible at or adjacent to the light slot or opening and capable of movement independently of each other to permit the exposing to the objective lens, for focusing purposes, of the entire object or copy-board. In order to utilize the same illuminating elements or lamps 8, 8 for focusing and photographing, and to enable the ready and quick positioning of the same at suitable positions in relation to the copy-board for providing proper illumination during the focusing operation, I preferably attach one illuminating element or lamp to each of the adjacent edges of the sections of the light-blocking element. As illustrated, the illuminating elements are mounted on boards 9 and 9' each of which have one longitudinal edge fastened by fasteners 10 to a section of the light-blocking element and have their other longitudinal edges fastened by fasteners 11 and cords 14, 14' to the frame 4. The fasteners 10 and 11 are preferably of a detachable type, such as clamps or buttons.

The frame 4 when fastened to the boards 9, 9' preferably causes the lamps 8, 8 to be positioned closely adjacent to the edge of the exposure-opening and said frame 4 is preferably provided along the edges of the exposure opening 6 therein with a flange 12 which functions to block-off direct exposure through the exposure opening of the lamps during the traversing toward the ends of field of view of the frame 4 having such opening, thus permitting the lamps to be positioned closer to the edge of the exposure opening than would otherwise be possible, while shielding from lens the lamp body.

The flexible sections of the light-blocking element comprise opaque flexible members guided and flexed adjacent to the ends of the copy-board, and as shown, at the upper and lower ends thereof by rollers 13, 13'. As illustrated, the sections 7', 7ª are mounted and wound in the same manner as shade rollers and are preferably automatically alternately wound on one or the other of the rollers in the conventional shade-roller method, when the frame 4 and sections 7', 7ª are traversed in opposite directions to photograph or when the sections are separated for focusing purposes.

Suitable means is preferably employed for drawing one of the sections 7', 7ª toward the frame 4 or releasing the same to permit automatic winding thereof on its roller and, as shown I utilize the cords 14, 14' connected to a drum or winch 15 rotated by shaft 15' on which is mounted a worm gear rotated by a worm 15ª on a shaft 15ᵇ turned by a crank 15ᶜ.

Suitable mechanism is also preferably employed for moving the apparatus toward and away from the copy-board and also for traversing the frame 4.

As illustrated, the entire apparatus is mounted on a main or primary frame 16 hung on shaft 17 provided with pinions 18 engaging racks 19, said pinions being rotatable to move the primary frame 16 toward and away from the copy-board by rotation of sprocket 20 mounted on the shaft 17 and manually rotated by chains 21.

The preferred form of mechanism for traversing the exposure frame 4 comprises the mounting at each side of the frame of a pair of conveyor chains mounted on pairs of pinions. This, as shown, I mount near the upper end of each side of the primary frame 16 by brackets or plates 22 two spaced pinions 23 and near the lower end mounting on shaft 24', two spaced pinions 24, and stretch a pair of conveyor chains over said pairs of spaced pinions 23 and 24. I connect the opposite ends of frame 4 to said paired conveyor chains by connecting rods 25 mounted to reciprocate in bearings 26 on the frame 4, the rods 25 being connected with the chains to extend between the spaced pinions so as to follow the chains around the pinions and thus to enable upward and downward movement of the frame 4 by a continuous rotary movement of the pinions and chains. Suitable gear mechanism is preferably provided for rotating the pinions to move the chains continuously in one direction and for this purpose, I have shown at each side of the frame 4 engaged gears 27, 28 and 29, the first-mentioned gear being mounted on the pinion shaft 24' and the latter being rotated by a worm 30 on a shaft 30' rotated by a motor 31.

Having described my invention, I claim:—

1. In photographic apparatus, the combination with a copy-board and an objective lens of a light-blocking element of opaque flexible material extending between said lens and copy-board and provided with a light-exposure opening having a length substantially equal to the length of the copy-board and a relatively narrow width, means for traversing the part of said light-blocking element containing the light-exposure opening over the copy-board, illuminating elements mounted on said light-blocking element adjacent to opposite sides of said exposure opening and on the surface thereof facing the copy-board, means for separating adjacent to said exposure opening said light-blocking element into a plurality of sections, each having illuminating elements associated therewith, and means for moving one of said sections independently of the other to permit positioning of said illuminating elements for focusing purposes.

2. In photographic apparatus, the combination with a copy-board and an objective lens of a light-blocking element of opaque flexible material extending between said lens and copy-board and provided with a light-exposure opening having a length substantially equal to the length of the copy-board and a relatively narrow width, means for traversing the part of said light-blocking element containing the light-exposure opening over the copy-board, illuminating elements mounted on said light-blocking element adjacent to opposite sides of said exposure opening and on the surface thereof facing the copy-board, means on opposite sides of said light-exposure opening for guiding and flexing portions of said light-blocking element to cause the same to occupy a relatively small lateral space, and a flange along the edge of said exposure-opening for shielding the illuminating elements from direct exposure to the lens during the traversing movement of the light-blocking element and opening.

3. In photographic apparatus, the combination with a copy-board and an objective lens of a light-blocking element comprising a rigid frame member surrounding a light exposure-opening and flexible light-blocking sections arranged on opposite sides of said frame and one of said sections having a releasable connection with said frame, means for traversing the part of said light-blocking element containing the light-exposure opening over the copy-board, illuminating elements mounted on said light-blocking element adjacent to opposite sides of said exposure opening and on the surface thereof facing the copy-board, means on opposite sides of said light-exposure opening for guiding and flexing portions of said light-blocking element to cause the same to occupy a relatively small lateral space, and a flange along the edge of said exposure-opening for shielding the illuminating elements from direct exposure to the lens during the traversing movement of the light-blocking element and opening.

4. In photographic apparatus, the combination with a copy-board and an objective lens of a light-blocking element comprising a rigid frame member surrounding a light exposure-opening and flexible light-blocking sections arranged on opposite sides of said frame and both of said sections having a releasable connection with said frame, means for traversing the part of said light-blocking element containing the light-exposure opening over the copy-board, illuminating elements mounted on said light-blocking element adjacent to opposite sides of said exposure opening and on the surface thereof facing the copy-board, means on opposite sides of said light-exposure opening for guiding and flexing portions of said light-blocking element to cause the same to occupy a relatively small lateral space, and a flange along the edge of said exposure-opening for shielding the illuminating elements from direct exposure to the lens during the traversing movement of the light-blocking element and opening.

5. In photographic apparatus, the combination with a copy-board and an objective lens of a light-blocking element comprising a rigid frame member surrounding a light exposure-opening and flexible light-blocking sections arranged on opposite sides of said frame and one of said sections having a releasable connection with said frame, automatic means mounted adjacent to opposite sides of said copy-board for rolling up said sections on a roller, and winch mechansim and cords on said exposure frame for pulling the end of one of said sections into contact with said frame.

6. In photographic apparatus, the combination with a copy-board and an objective lens of a light-blocking element comprising a rigid frame member surrounding a light exposure-opening and flexible light-blocking sections arranged on opposite sides of said frame and one of said sections having a releasable connection with said frame, a primary frame on which said light-blocking element is mounted, means for moving said frame toward and away from the copy-board, means for separating adjacent to said exposure opening said light-blocking element into a plurality of sections, each having illuminating elements associated therewith, means for moving one of said sections independently of the other to permit positioning of said illuminating elements for focusing purposes, gear mechanism mounted in said frame for traversing the part of the light-blocking element having said exposure opening across the copy-board, automatic means mounted adjacent to opposite sides of said copy-board for rolling up said sections on a roller, and winch mechanism and cords on said exposure frame for pulling the end of one of said sections into contact with said frame.

7. In photographic apparatus, the combination with a copy-board and an objective lens of a light-blocking element comprising a rigid frame member provided with a light-exposure opening having a length substantially equal to the length of the copy-board and a relatively narrow width and opaque flexible material stretched between the opposite ends of the copy-board and said rigid frame member and extensible between said lens and copy-board, means for traversing the said rigid frame member over the copy-board, illuminating elements mounted on said rigid frame member adjacent to opposite sides of said exposure opening and on the surface thereof facing the copy-board, and means on opposite sides of said light-exposure frame member operable contemporaneously with said frame-transversing means for simultaneously rolling and unrolling portions of said flexible light-blocking element.

ELLIS WEISKER.